(No Model.)

J. H. KENNEDY.
SPRING VEHICLE.

No. 402,938.

Patented May 7, 1889.

WITNESSES:
C. Bendixon
H. P. Denison

INVENTOR
John H. Kennedy
BY
Snell, Laesshead
ATTORNEY

UNITED STATES PATENT OFFICE.

JOHN H. KENNEDY, OF ONEIDA, NEW YORK, ASSIGNOR TO J. L. SPENCER & CO., OF SAME PLACE.

SPRING-VEHICLE.

SPECIFICATION forming part of Letters Patent No. 402,938, dated May 7, 1889.

Application filed November 8, 1886. Serial No. 218,276. (No model.)

*To all whom it may concern:*

Be it known that I, JOHN H. KENNEDY, of Oneida, in the county of Madison, in the State of New York, have invented new and useful Improvements in Spring-Vehicles, of which the following, taken in connection with the accompanying drawings, is a full, clear, and exact description.

This invention relates to the class of spring-vehicles which have the rear portion of the body supported on the rear axle by short springs secured at one end to the body and projecting rearward therefrom. Such springs have hitherto been coupled directly to the rear axle, and in consequence thereof the body was hung so low as to greatly interfere with the cramping or turning of the forward axle, and the coupling-arms, which hung the body on the forward spring, had to be unduly elongated vertically. Furthermore, the longitudinal play of the rear side springs was so limited that when they were subjected to a load on the body of the vehicle the front cross-spring was crowded forward. To obviate these defects I mount on the rear axle a suitable spring-support which rises from the axle and has the rear ends of the short longitudinal springs connected to it, all as hereinafter more fully described, and specifically set forth in the claim.

Figure 1:
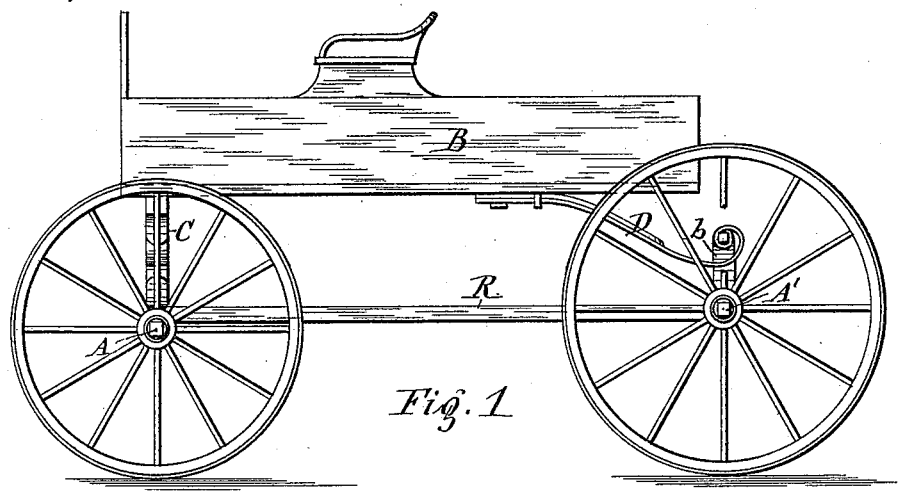
Figure 2:
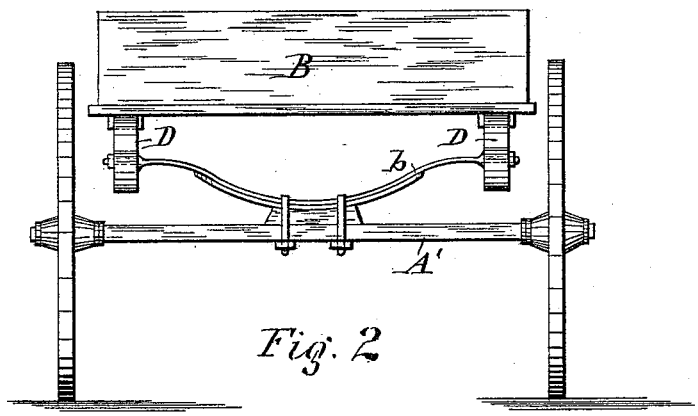
Figure 3:
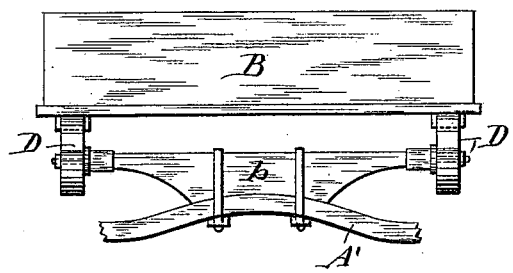

In the annexed drawings, Figure 1 is a side elevation of a vehicle embodying my improvements, portions of the wheels being broken away to better illustrate the invention. Fig. 2 is a rear end view of the same, and Fig. 3 shows a modification of my invention.

Similar letters of reference indicate corresponding parts.

A and A' represent, respectively, the forward and rear axles of the vehicle. R is the reach connecting said axles, and B denotes the body or box, which may be supported on the forward axle by a cross-spring, C, in any suitable and well-known manner.

D D represent the short longitudinal springs, which are at their forward ends firmly secured either to the under side of the body, some distance forward from the rear end thereof, or to the ends of a cross-bar attached to the aforesaid portion of the body and projecting over the sides thereof. The rear ends of the springs D D, I connect to a support, $b$, which may consist either of a cross-spring secured to the top of the axle A', as represented in Fig. 2 of the drawings, or of a rigid bolster mounted on said axle, as shown in Fig. 3 of the drawings, either of said supports rising from the axle to a proper elevation to carry the body B at a correspondingly-elevated position, and thus allow the forward wheels to pass part way under the body when the forward axle is turned on its king-bolt. I prefer, however, the employment of a cross-spring for the aforesaid support, as shown in Fig. 2 of the drawings, said spring being formed with trunnions on its ends for the reception of the usual eyes formed on the rear ends of the springs D D. By means of said cross-spring I increase the elasticity of the support of the body. Where a rigid bolster is desired, as shown in Fig. 3 of the drawings, I attach to the ends thereof suitable clips provided with shackle-eyes for the attachment of the rear ends of the springs D D.

In order to increase the elasticity of the longitudinal springs D D, and at the same time relieve the spring-support $b$ from the torsional strain incident to the vibrations of the longitudinal springs when subjected to pressure, I increase the sweep of said springs, preferably by extending the rear ends thereof under and rearward from the spring-support $b$, and then curving them upward and back over the spring-support and terminating them with eyes, by which the longitudinal springs are coupled to the ends of the aforesaid spring-support.

The increased sweep of the longitudinal springs allows them ample play endwise without straining the spring-support $b$ and front cross-springs, C, either forward or rearward.

I do not claim, broadly, the combination, with the running-gear and body of a cross-spring supporting the front end of the body and short side springs supporting the rear end of said body. Neither do I claim, broadly, the combination of a spring provided with eyes on its ends receiving through them trunnions on the spring-support, as I aware that such devices are not new; but

What I claim as new, and desire to secure by Letters Patent, is—

In combination with the front and rear running-gears, the body of the vehicle extending over the front running-gear, the cross-spring C, mounted on the said running-gear and arranged completely under the body, the spring-support $b$, rising from the rear axle and formed with trunnions on its ends, and the short side springs, D D, terminating with their front ends at the under side of the central portion of the body and attached directly thereto and having their rear ends extending under the ends of the spring-support $b$ and rearward therefrom, and thence curved upward and forward and terminating with eyes by which they are connected directly to the trunnions of the spring-support, substantially as described and shown.

In testimony whereof I have hereunto signed my name and affixed my seal, in the presence of two attesting witnesses, at Syracuse, in the county of Onondago, in the State of New York, this 1st day of November, 1886.

JOHN H. KENNEDY. [L. S.]

Witnesses:
C. BENDIXON,
HOWARD P. DENISON.